United States Patent
Herriot et al.

(10) Patent No.: US 9,849,796 B2
(45) Date of Patent: Dec. 26, 2017

(54) METHOD FOR CHARGING A VEHICLE BATTERY BY INDUCTION

(71) Applicant: SCHNEIDER ELECTRIC INDUSTRIES SAS, Rueil-Malmaison (FR)

(72) Inventors: Yann Herriot, Grenoble (FR);
Dimitrios Ladas, Grenoble (FR);
Gauthier Leconte, Grenoble (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 145 days.

(21) Appl. No.: 14/780,853

(22) PCT Filed: Mar. 27, 2014

(86) PCT No.: PCT/FR2014/050728
§ 371 (c)(1),
(2) Date: Sep. 28, 2015

(87) PCT Pub. No.: WO2014/167207
PCT Pub. Date: Oct. 16, 2014

(65) Prior Publication Data
US 2016/0059713 A1     Mar. 3, 2016

(30) Foreign Application Priority Data
Apr. 11, 2013 (FR) ...................... 13 53253

(51) Int. Cl.
*B60L 11/18* (2006.01)
*H02J 7/02* (2016.01)
(Continued)

(52) U.S. Cl.
CPC ......... *B60L 11/182* (2013.01); *B60L 11/1811* (2013.01); *H02J 7/025* (2013.01);
(Continued)

(58) Field of Classification Search
CPC ..................................................... B60L 11/182
(Continued)

(56) References Cited

U.S. PATENT DOCUMENTS

2012/0043930 A1  2/2012  Scudiere
2013/0026848 A1  1/2013  Ito
(Continued)

FOREIGN PATENT DOCUMENTS

| EP | 2 530 812 A1 | 12/2012 |
| FR | 2 947 113 A1 | 12/2010 |
| WO | WO 2012/024250 A1 | 2/2012 |

OTHER PUBLICATIONS

International Search Report dated Aug. 20, 2014, in PCT/FR2014/050728 filed Mar. 27, 2014.
(Continued)

*Primary Examiner* — Samuel Berhanu
*Assistant Examiner* — Tessema Kebede
(74) *Attorney, Agent, or Firm* — Oblon, McClelland, Maier & Neustadt, L.L.P.

(57) ABSTRACT

The invention relates to a method for charging a vehicle battery by induction from a charging device including a charge transmitter including a primary coil L1 and an inverter capable of supplying the primary coil L1 with an AC supply voltage E. Said device also includes a charge receiver including a secondary coil L2 arranged in a vehicle. Said method consists of adjusting a frequency f of the power supply voltage (E) to the resonance frequency fo, when a motor vehicle is located in a parking space. Said method comprises the following steps: setting a first power-transmission parameter (E, f); starting an iterative test which consists of: setting a value of a second power-transmission parameter (E, f); varying the second power-transmission parameter (E, f) in a second authorized adjustment range;
(Continued)

measuring the power (Pbat) transmitted between the charge transmitter and the charge receiver; determining if the power (Pbat) is no lower than a predetermined operating threshold (PObj); determining if the power (Pbat) increases; ending the iterative test if the transmitted power (Pbat) is higher than the predetermined operating threshold (PObj); setting the power supply voltage (E) in order to reach the measured transmitted power (Pbat), said first and second transmission parameters being set to the previously established value thereof.

13 Claims, 8 Drawing Sheets

(51) Int. Cl.
- *H02J 50/12* (2016.01)
- *H02J 50/80* (2016.01)
- *H01F 38/14* (2006.01)
- *H02J 5/00* (2016.01)

(52) U.S. Cl.
CPC .............. *H02J 50/12* (2016.02); *H02J 50/80* (2016.02); *B60L 2210/30* (2013.01); *B60L 2210/40* (2013.01); *B60L 2240/527* (2013.01); *B60L 2240/529* (2013.01); *H01F 2038/146* (2013.01); *H02J 5/005* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01)

(58) Field of Classification Search
USPC .......................................................... 320/108
See application file for complete search history.

(56) References Cited

U.S. PATENT DOCUMENTS

| | | | |
|---|---|---|---|
| 2014/0054971 A1* | 2/2014 | Kissin | H04B 5/0075 307/104 |
| 2014/0070764 A1* | 3/2014 | Keeling | H02J 50/50 320/108 |
| 2015/0048788 A1* | 2/2015 | Doffin | B60L 11/1812 320/108 |

OTHER PUBLICATIONS

Wang, Chwei-Sen et al., "Design Considerations for a Contactless Electric Vehicle Battery Charger", IEEE Transactions on Industrial Electronics, vol. 52, No. 5, (Oct. 1, 2005), pp. 1308-1314, XP011139887.

\* cited by examiner

METHOD FOR CHARGING A VEHICLE BATTERY BY INDUCTION

TECHNICAL FIELD OF THE INVENTION

The invention relates to a method for charging an electric battery of a motorized vehicle by induction, from a charging device. Said device comprises, on the one hand, a charge transmitter comprising a primary coil positioned in a parking space for a motorized vehicle, an inverter suitable for delivering to the primary coil an alternating power supply voltage. Said device also comprises a charge receiver comprising a secondary coil arranged in the vehicle positioned in the parking space. Said method consists in matching a frequency of the power supply voltage of the inverter to a value substantially equal to the resonance frequency of the charging device when a motorized vehicle is located in the parking space.

STATE OF THE ART

There are many techniques for charging electric vehicles. It is known practice to use cables or electric wires to link the vehicle to the battery charger. Other, so-called contactless, solutions such as, for example, the induction charging techniques are also described.

The induction charging techniques notably offer the benefit of eliminating the problems linked to the corrosion of the electrical contacts on the chargers and the electrical outlets. These techniques also make it possible to simplify the electrical operations required of the users, operations which can sometimes present objective risks.

The principle of induction recharging is linked here to the use of a weakly-coupled so-called "air-filled" transformer.

The transformer comprises a primary coil connected electrically to the charge converter situated in the ground and a secondary coil connected electrically to the receiver embedded in the vehicle.

In practice, the primary coil and the secondary coil are separated by a wide "air gap".

The charger converter generates a current in the primary. This current generates a magnetic field, some of which passes through the secondary. This then induces a current in the secondary, which will make it possible to charge the battery.

The charging of the battery which is based on a weakly-coupled transformer (air-filled transformer) requires robust control laws that make it possible:

- to ensure the safety of the battery during the charging (current ripple, overshoots, etc.);
- optimize the efficiency of the power transfer;
- minimize the radiated magnetic field level.

Figure 1:
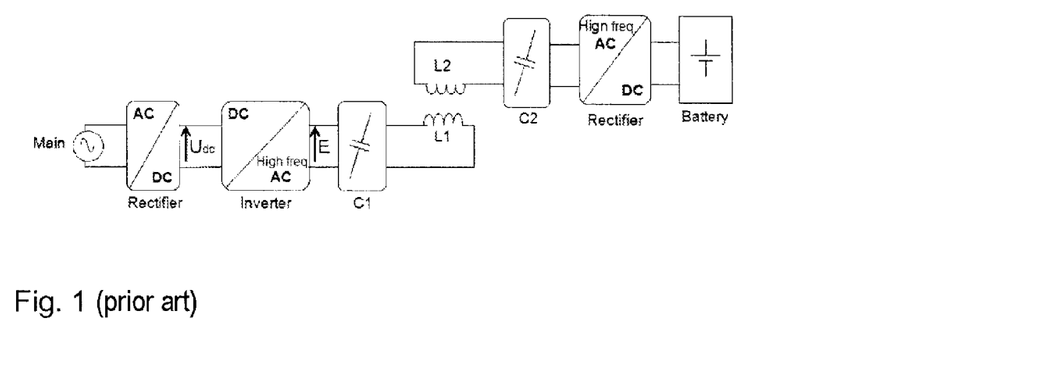
FIG. 1 represents a schematic depiction of an induction charging architecture incorporating the mains and the battery of the vehicle.

As represented in FIG. 1, the charging system comprises, on the one hand, a charge transmitter, comprising an AC/DC converter (rectifier), an inverter and a primary coil L1 positioned in a parking space for a motorized vehicle. The charging system further comprises a charge receiver comprising a secondary coil L2 arranged in the vehicle positioned in the parking space. The secondary coil is generally linked to a battery of the vehicle through another AC/DC converter (rectifier).

A magnetic coupling $K_{mag}$ is defined as a ratio between a value of mutual inductance M between the primary coil and the secondary coil and the square root of the product of the inductances of said coils L1, L2. The magnetic coupling is expressed in the form of the following equation (1):

$$K_{mag} = \frac{M}{\sqrt{L_1 \times L_2}} \quad (\text{Eq1})$$

In the case of a perfectly coupled transformer, where all of the magnetic flux is common to both windings (primary and secondary), the magnetic coupling is equal to 1 ($K_{mag}=1$).

In the case of the charging of an electric vehicle by induction, the absence of a magnetic core generates fairly significant leaks. The magnetic coupling can then vary between 0.1 and 0.6. In the absence of any system for mechanically positioning the coils, this magnetic coupling depends on the position between the primary and secondary coils L1, L2, in other words on the position of the vehicle relative to the recharging terminal containing the primary coil.

If the transformer is powered in air directly by a variable voltage source, the latter will have to supply the reactive energy stored in the inductances. In practice, this would amount to over-engineering this power supply. Another natural consequence would be to obtain very low efficiencies, because the excessively high currents generated would tend to dissipate energy in the series resistances of the windings (losses by Joule effect).

To minimize the drawbacks described above, capacitors C1, C2 are used to compensate the reactive energy of the inductances L1, L2. In this exemplary application, the capacitors are placed in series relative to the primary coil and the secondary coil.

The so-called series compensation at the primary is notably made necessary by the predominantly widespread use of the voltage inverters. The use of current inverters would amount to adding an extra inductance which would pointlessly increase the complexity of the architecture.

The so-called series compensation at the secondary renders the architecture symmetrical and greatly lightens the electrical architecture in the vehicle. In effect, the use of a capacitance in parallel to the secondary would require the addition of an induction coil of significant weight and cost in the vehicle.

The induction charging of the electric vehicle has to address the problem of variable coupling between the primary and secondary circuits of the transformer: coupling dependent on the positioning of the car in its location and dependent on the size of the car. An optimized system operates with full voltage and current resonance, that is to say with a maximum output voltage $U_{inv}$, $I_{inv}$ equal to the rated current of the inverter, and $I_{inv}$ in phase with $U_{inv}$.

In effect, in the scheme proposed in FIG. 1, the inverter is a voltage inverter, with a fixed input voltage Udc and designed for a maximum output current ($I_{inv}$max). Inherently, the voltage inverter limits the maximum input voltage Udc that can be accepted, and does so according to the chosen semiconductor technology. Thus, the power of the voltage inverter is increased by increasing the current that can be accepted, that is to say by increasing the current rating of the semiconductors, or by improving their cooling. The given maximum current does indeed therefore provide the maximum available power at full resonance.

By accepting that the transformer has been optimized for a given coupling $K_{mag}$, a variation of the coupling will necessarily change the operating point. The transformer is considered to be optimized when the system operates at full resonance at the rated current of the inverter to transmit a charging power corresponding to a set point. In effect, if the charging power is kept at the setpoint value and if the output voltage E of the inverter (variable by control) was already maximum, then, to observe said power setpoint despite a non-optimal coupling, the current of the inverter will have to increase if the output voltage $U_{inv}$ decreases.

Also, in the usual case, it is necessary to over-rate the inverter in current to be able to tolerate greater current phases when the coupling is degraded.

Figure 2:
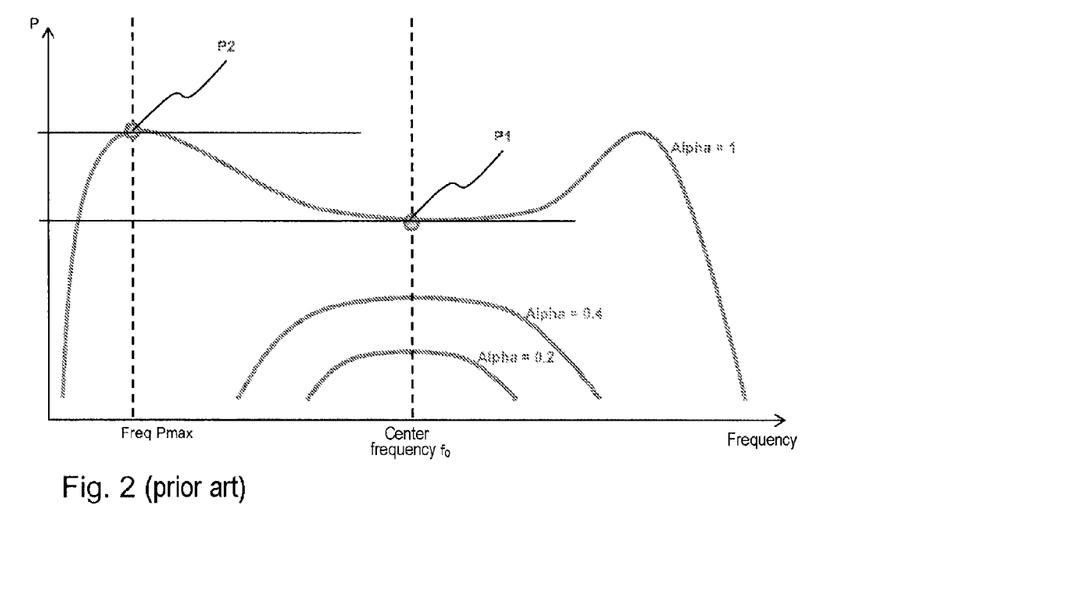
FIG. 2 represents trend curves of the transmitted power as a function of the frequency and of the duty cycle of the inverter of a charge transmitter of an architecture according to FIG. 1.

The solution described in the patent FR2947113 proposes setting the frequency f of the output voltage E of the inverter at the resonance frequency $f_0$ and regulating the phase between the voltage and the current at the primary of the circuit in order to remain at resonance. This solution tends to guarantee the optimal operation of the system (efficiency) whatever the position of the primary relative to the secondary. This idea is based on a full-wave operation of the inverter, with the possibility of modifying the value of the input voltage of the inverter Udc to regulate the transmitted power. Full-wave operation of the inverter means that the inverter has a duty cycle equal to 1 ($\alpha$=1) to deliver a maximum output voltage E. The solution described considers that the operation at resonance $f_0$ is the optimal operation of the system. This leads to a conversion architecture being chosen in which the inverter will be driven with fixed duty cycle ($\alpha$=1) and the output voltage E will be regulated at an additional DC/DC member added between the mains and the inverter. Furthermore, this solution requires the input voltage $U_{dc}$ of the inverter to be able to be modified. Furthermore, the drawback of the solution of the patent FR2947113 is the exclusive use of the resonance frequency $f_0$. In effect, the transformer according to this solution does not make it possible to always transfer the power demanded, in particular when the magnetic coupling is good. As represented in FIG. 2, in which transferred power is represented as a function of the frequency and of the duty cycle of the inverter, there is a second power setpoint value P2 which will never be reached with a system which regulates the frequency of the power supply voltage E supplied by the inverter on the central resonance frequency $f_0$. With this exemplary embodiment, any power setpoint greater than a first setpoint value P1 will not be able to be reached when the frequency of the power supply voltage of the inverter is equal to the resonance frequency $f_0$.

The solution described in the patent application WO201224250 proposes setting the frequency f of the inverter at a frequency which is lower than the resonance frequency $f_0$. Although this solution makes it possible to extend the power range that can be used by the installation, said solution does not optimize the electrical efficiency and the emitted magnetic field level.

Although some known solutions tend to improve the efficiency of the charging transformer, notably by optimizing the frequency of the inverter, said solutions are not optimal in terms of electromagnetic radiation.

EXPLANATION OF THE INVENTION

The invention therefore aims to remedy the drawbacks of the prior art, in such a way as to propose an induction charging method that is efficient from an energy point of view, that observes the electromagnetic pollution constraints and that reduces the maximum current constraints on the voltage inverter.

The charging method according to the invention comprises the following steps:
 setting a first power transmission parameter (E, f);
 starting an iterative test consisting in:
  setting a value of a second power transmission parameter;
  varying the second power transmission parameter over a second authorized adjustment range;
  measuring the power transmitted between the charge transmitter and the charge receiver;
  determining whether the power is equal to or greater than a pre-established operating threshold;
  determining whether the power increases;
 ending the iterative test if the power transmitted is greater than the pre-established operating threshold;
 setting the power supply voltage of the primary coil in order to reach the measured transmitted power, the first and second power transmission parameters being set to their previously established value.

Preferably, the charging method consists in ending the iterative test if the transmitted power is below the pre-established operating threshold, and a derivative value of the transmitted power relative to time is negative.

Preferably, the first power transmission parameter is variable in a first authorized adjustment range.

According to a particular embodiment, the first power transmission parameter is equal to the frequency of the power supply voltage of the inverter. The second power transmission parameter is equal to the power supply voltage of the primary coil, said power supply voltage varying in a second voltage range comprising limits.

According to another particular embodiment, the first power transmission parameter is equal to the power supply voltage of the primary coil. The second power transmission parameter is equal to the frequency of the power supply voltage of the inverter.

According to a preferential embodiment, the frequency of the power supply voltage varies in a frequency range comprising limits respectively having values higher than the resonance frequency.

Advantageously, the frequency of the power supply voltage varies between the second high value and the first low value.

Advantageously, the frequency of the power supply voltage varies between the first low value and the second high value.

According to one mode of development, a step of the charging method consists in changing the frequency tuning of the primary coil of the charge transmitter and/or of the secondary coil of the charge receiver.

Preferably, this consists in modifying a capacitance value connected in series or parallel with the primary coil and/or a capacitance value connected in series or in parallel with the secondary coil.

Advantageously, this consists in controlling switch means suitable for connecting one or more capacitors in series with the primary coil and/or the secondary coil.

Advantageously, this consists in controlling switch means suitable for connecting one or more capacitors in parallel with the primary coil and/or the secondary coil.

According to one mode of development, a step of the charging method consists in changing the magnetic coupling between the primary coil and the secondary coil, a coupling coefficient between the two coils varying between 15 and 45% of the maximum value of said coefficient.

BRIEF DESCRIPTION OF THE FIGURES

Other advantages and features will emerge more clearly from the following description of a particular embodiment of the invention, given as a nonlimiting example, and represented in the attached drawings in which.

DETAILED DESCRIPTION OF AN EMBODIMENT

The method for charging an electric battery of a motorized vehicle according to the invention is intended to be implemented by a charging device. As represented in FIG. 1, the charging device comprises a charge transmitter associated with a charge receiver.

The charge transmitter comprises a primary coil L1 positioned in a parking space for a motorized vehicle. Said transmitter also comprises an inverter suitable for delivering to the primary coil L1 an alternating power supply voltage E. An input voltage Udc is applied to the input terminals of the inverter.

The value of the power supply voltage E of the primary coil is directly dependent on a first parameter equal to the duty cycle α of the inverter and a second parameter equal to the input voltage Udc. According to the embodiment chosen, the first and second parameters can be modified by the user.

The primary coil L1 is tuned in frequency to the primary capacitance means C1 placed in series or in parallel to said coil.

The charge receiver comprises a secondary coil L2 arranged in the motorized vehicle. When the vehicle is positioned in the parking space, the primary and secondary coils are coupled. In the absence of any mechanical locking system, the magnetic coupling between the primary coil L1 and the secondary coil L2 is variable as a function of the positioning of the vehicle in the parking space. It depends also on the motorized vehicle, and on the ground clearance. In the case of two perfectly coupled coils (primary and secondary), all of the magnetic fluxes are common to both coils L1 and L2. The magnetic coupling coefficient $K_{mag}$ is then equal to 1 ($K_{mag}=1$).

According to a variant embodiment not represented, the charging device comprises adjustment means suitable for modifying the value of the coupling coefficient $K_{mag}$ between the two coils L1, L2. In other words, the magnetic coupling between the primary coil L1 and the secondary coil L2 is then controllable. Said means are operational when the motorized vehicle is positioned on the parking space. As represented in FIGS. 3A to 3D, by way of example, the coupling coefficient $K_{mag}$ between the two coils L1, L2 can vary between 15 and 45% of the maximum value of said coefficient.

Thus, according to this variant development of the invention, for a power supply voltage E at the central resonance frequency $f_0$, the transmitted electrical power value $P_{bat}$ tends to increase in a manner inversely proportional to the value of the coupling coefficient.

The central resonance frequency $f_0$ is defined by the following equation (2):

$$f_0 = \frac{1}{2 \cdot \pi \sqrt{L1, C1}} \qquad (Eq2)$$

Furthermore, it emerges from the curves of FIGS. 4A to 4D that the threshold electrical power $P_{obj}$ set by way of example at 6 kW is reached at the resonance frequency $f_0$ for a coupling coefficient value $K_{mag}$ equal to 0.15 and for a power supply voltage of the primary coil equal to less than 50% of the maximum voltage value. According to this exemplary embodiment, the primary and secondary coils L1, L2 have been optimized to transmit a power of 6 kW at a frequency equal to $f>f_0$ with a coupling coefficient equal to 0.3 (kmag=0.3).

This same threshold electrical power value $P_{obj}$ of 6 kW is no longer reached at the resonance frequency $f_0$ for a coupling coefficient value $K_{mag}$ equal to 0.3. In effect, as FIGS. 5A to 5D show, the threshold electrical power $P_{obj}$ is not reached for all the values of the power supply voltage E varying between 40 and 100% of the maximum value. In the example of operation presented in which the coupling coefficient $K_{mag}$ is equal to 0.3, it is possible to obtain the threshold electrical power $P_{obj}$ of 6 kW at a high frequency (f>f0) and with a maximum power supply voltage E. "High frequency" will be understood to mean a frequency f of power supply voltage E greater than the central resonance frequency $f_0$.

Figure 3A:
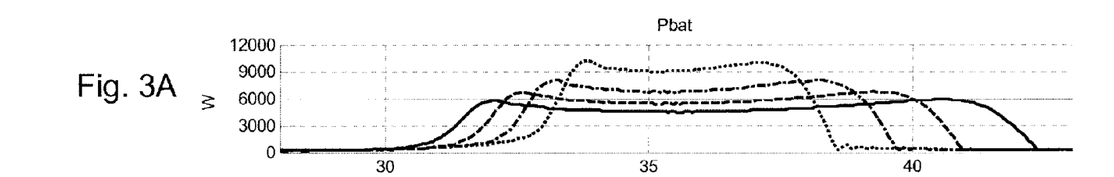
FIGS. 3A to 3D respectively represent trend curves of the transmitted power, of the electrical current in the primary circuit, of the phase-shift between the voltage and the current in the inverter, of the phase-shift between the primary and secondary currents, as a function of the frequency, in a first mode of operation of the method according to the invention, when the duty cycle is fixed and the magnetic coupling varies.
Figure 3B:
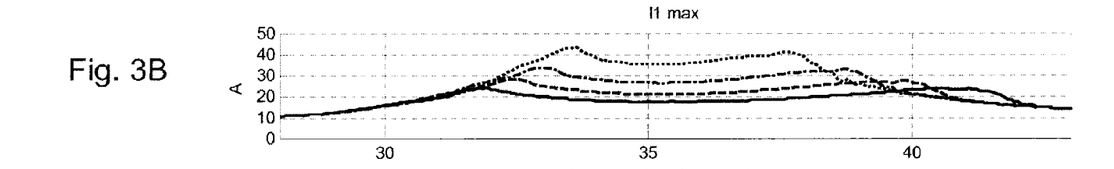
Figure 3C:
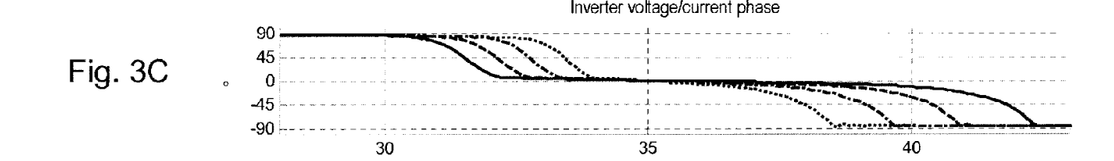
Figure 3D:
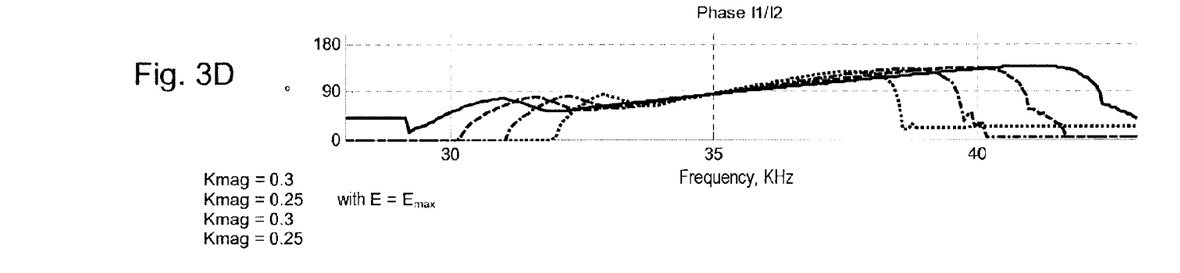

Furthermore, it emerges from the curves of FIG. 3B that the primary current I1 supplied by the inverter increases with the reduction of the coupling $K_{mag}$. For this example, the power supply voltage E is set at its maximum value $(E=E_{max})$.

Figure 4A:
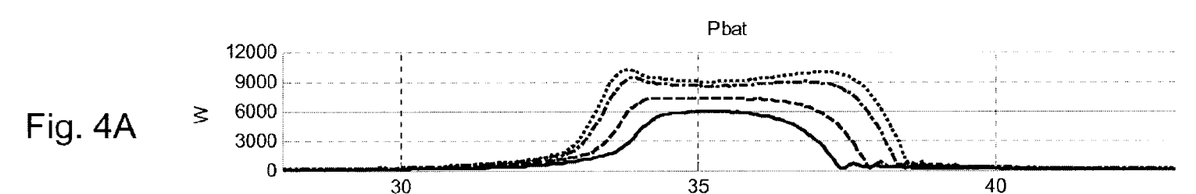
FIGS. 4A to 4D respectively represent trend curves of the transmitted power, of the electrical current in the primary circuit, of the phase-shift between the voltage and the current in the inverter, of the phase-shift between the primary and secondary currents, as a function of the frequency, in a second mode of operation of the method according to the invention, when a duty cycle varies and the magnetic coupling is set at a first value.
Figure 4B:
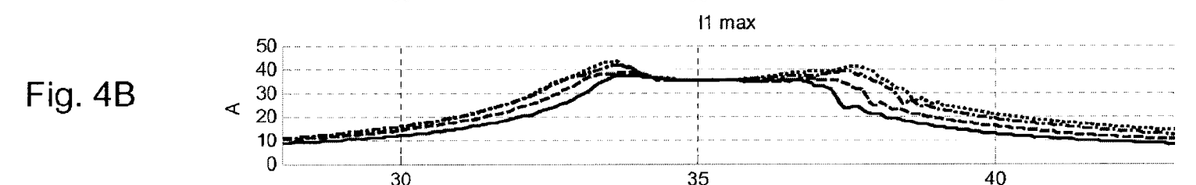
Figure 4C:
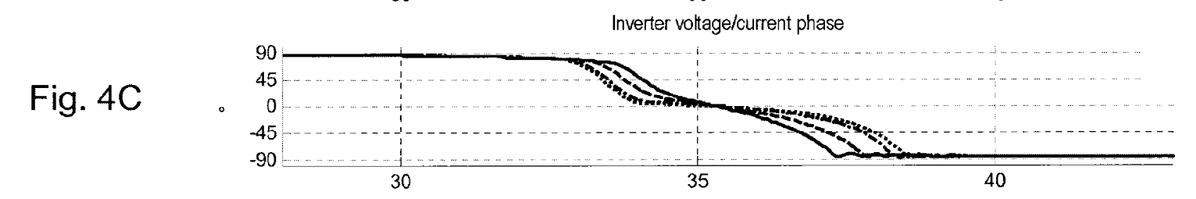
Figure 4D:
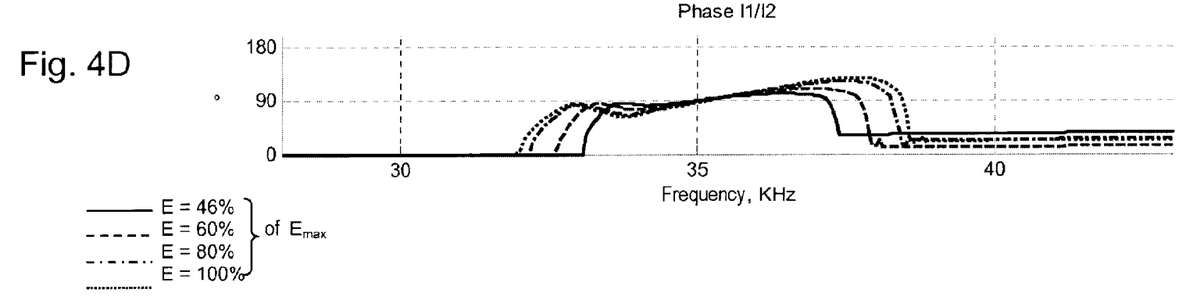
Figure 5A:
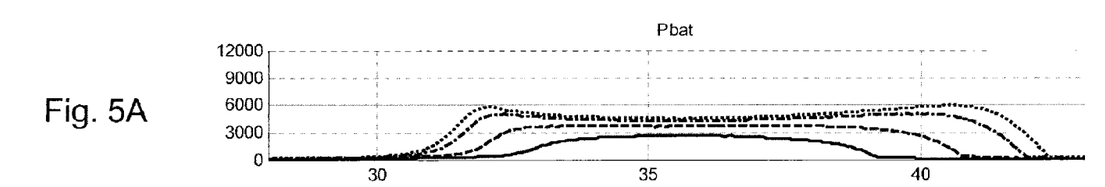
FIGS. 5A to 5D respectively represent trend curves of the transmitted power, of the electrical current in the primary circuit, of the phase-shift between the voltage and the current in the inverter, of the phase-shift between the primary and secondary currents, as a function of the frequency, in the second mode of operation of the method according to the invention, when the duty cycle varies and the magnetic coupling is set at a second value.
Figure 5B:
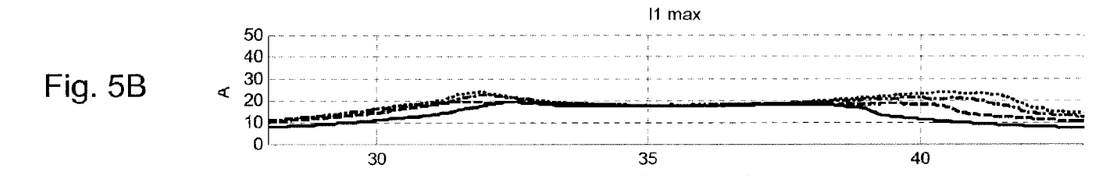
Figure 5C:
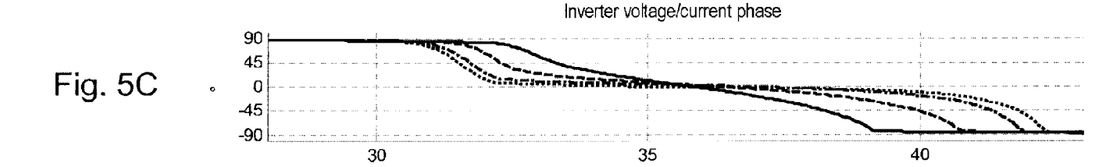
Figure 5D:
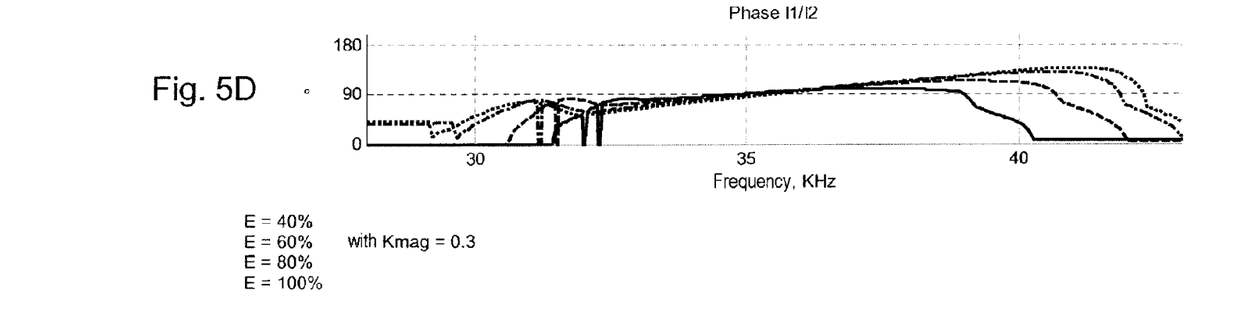

In addition, the curves of FIG. 4B show that the primary current I1 supplied by the inverter is primarily a function of the magnetic coupling $K_{mag}$, and not of the power supply voltage E.

Also, according to the exemplary embodiments represented in FIGS. 3, 4 and 5, for identical primary and secondary coils L1, L2, the primary current I1 supplied by the inverter can vary from 26 A to 37 A peak to transmit a threshold electrical power $P_{obj}$ of 6 kW.

Figure 6A:
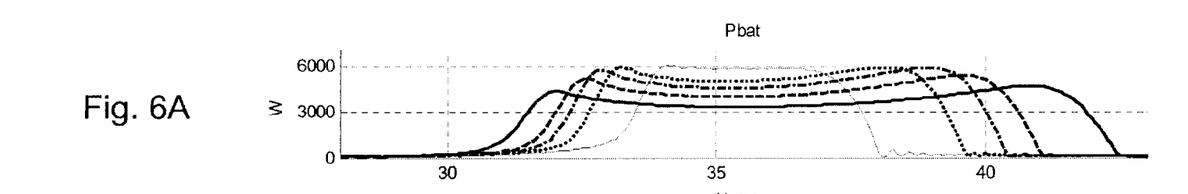
FIGS. 6A to 6D respectively represent trend curves of the transmitted power, of the electrical current in the primary circuit, of the phase-shift between the voltage and the current in the inverter, of the phase-shift between the primary and secondary currents, as a function of the frequency, in a third mode of operation of the method according to the invention, when the duty cycle and the magnetic coupling vary.
Figure 6B:
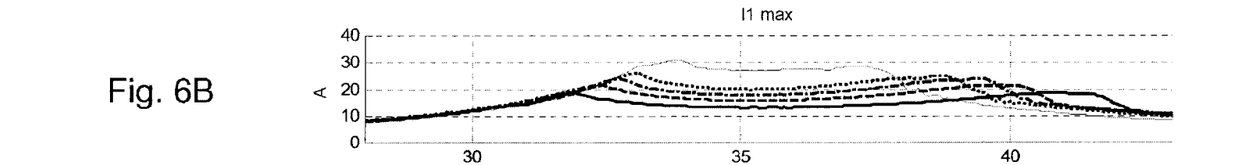
Figure 6C:
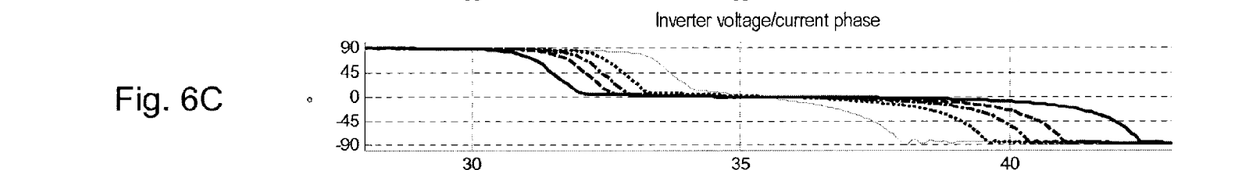
Figure 6D:
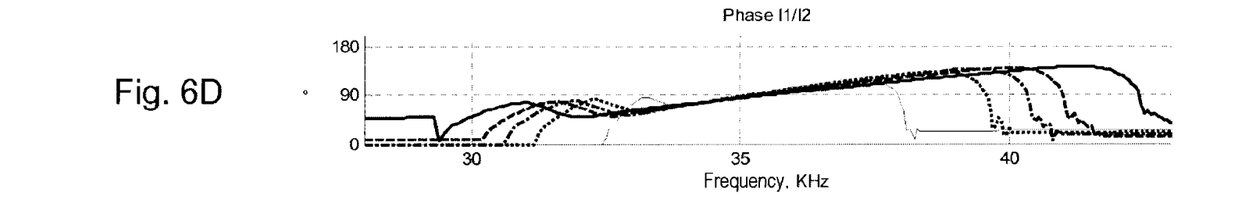

As an exemplary embodiment, the induction charging device is optimized to transmit a maximum power of 6 kW (Pmax=6 kW) when the two primary and secondary coils have the same inductance (L1=L2=570 pH) and the coupling coefficient is equal to 0.225 (Kmag=0.225). According to this exemplary embodiment, the curves of FIGS. 4B and 6B representative of the electrical current I1 in the primary circuit show that it is possible to reduce the primary current supplied by the inverter for a same coupling, by choosing inductance values L1 and L2 offering one of the operating points optimized for lower magnetic couplings. In effect, for a coupling equal to 0.15 (Kmag=0.15) and to transmit a power of 6 kW (P=6 kW), the peak primary current I1 can vary from 28 A (FIG. 6B) to 37 A (FIG. 4B).

The charging method according to the invention consists, in a preliminary step, in tuning the frequency f of the power supply voltage E of the inverter to a value substantially equal to the resonance frequency $f_0$ of the charging device when the motorized vehicle is located on the parking space.

The aim of the method according to the invention is to match and/or optimize the real charging power $P_{bat}$ transmitted in order to reach or approach a threshold electrical power value $P_{obj}$. The threshold electrical power $P_{obj}$ is matched to the type of electric battery present in the motorized vehicle.

According to a general mode of development, the charging method comprises the following steps.

A first step consists in setting a first power transmission parameter (E, f). "First power transmission parameter" will be understood to mean a parameter that can be adjusted in the context of the method and which significantly influences the value of the power transmitted $P_{bat}$ from the inverter to the battery of the vehicle. A modification of the power transmission parameter can increase or decrease the value of the transmitted power $P_{bat}$.

This first step is followed by an iterative test. Said test consists, initially, in setting a value of a second power transmission parameter E, f. As previously, a modification of the second power transmission parameter significantly influences the value of the power transmitted $P_{bat}$ from the inverter to the battery of the vehicle.

The method according to the invention consists in varying the second power transmission parameter E, f over a second authorized adjustment range. The power $P_{bat}$ transmitted between the charge transmitter and the charge receiver is measured and is compared to a pre-established operating threshold. Said threshold is equal to the threshold electrical power value $P_{obj}$. By way of example, the measurements of power $P_{bat}$ transmitted are produced from voltage and current quantities available on the primary side, or from measurements performed and transmitted by the motorized vehicle.

If the power $P_{bat}$ transmitted is greater than or equal to the threshold electrical power $P_{obj}$, then the ultimate step of the method according to the invention consists in setting the power supply voltage E of the primary circuit L1, C1 in order to reach the measured transmitted power $P_{bat}$, the first and second power transmission parameters E, f being set at their previously established value.

If the power $P_{bat}$ transmitted is less than the threshold electrical power $P_{obj}$, then the method tends to evaluate the trend of the power $P_{bat}$ transmitted. The measurement of the derivative of the power $P_{bat}$ transmitted relative to time is performed to know the trend of the transmitted power.

If the power $P_{bat}$ transmitted tends to increase ($dP_{bat}/dt>0$) then the iterative test continues If said measured transmitted power tends to decrease ($dP_{bat}/dt<0$) then the iterative test is ended.

According to this general mode of development, the ultimate step of the method then consists in setting the power supply voltage E of the primary coil L1 in order to reach the measured transmitted power $P_{bat}$, the first and second power transmission parameters E, f being set at their previously established value.

According to a first preferential mode of development, the first power transmission parameter (E, f) is variable in a first authorized adjustment range. The value of the first power transmission parameter (E, f) is modified to take another value lying within the first adjustment range and the iterative test is then restarted.

Figure 10:
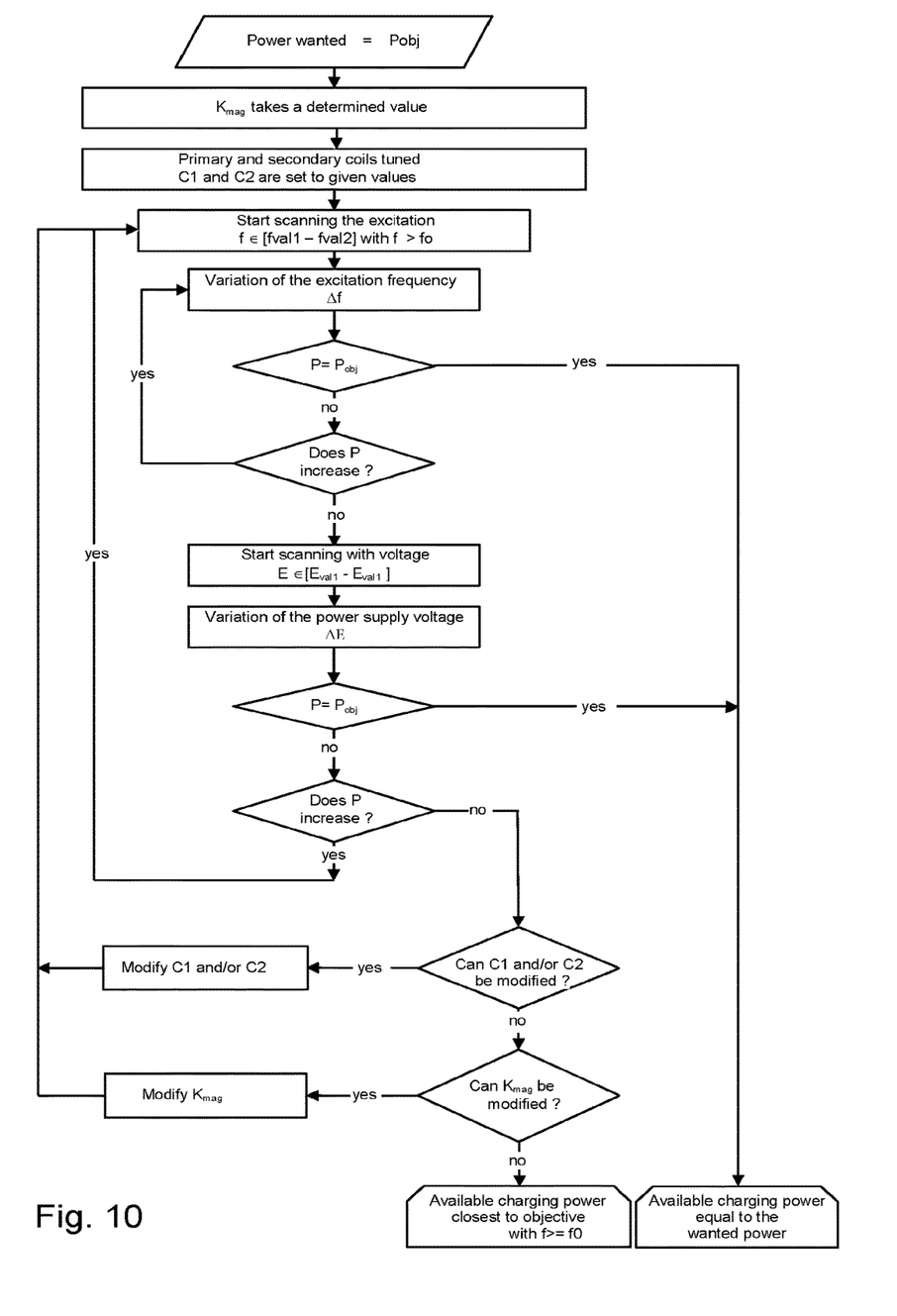
FIG. 10 represents a flow diagram showing the sequencing of the steps of the charging method according to a preferential embodiment of the invention.

According to a particular embodiment as represented in FIG. 10, the first power transmission parameter is equal to the frequency f of the power supply voltage E of the inverter. The second power transmission parameter is equal to the power supply voltage E of the primary coil L1, said power supply voltage E varying in a second voltage range comprising limits $E_{val1}$, $E_{val2}$.

According to another particular embodiment not represented, the first power transmission parameter is equal to the power supply voltage E of the primary coil L1 and the second power transmission parameter is equal to the frequency f of the power supply voltage E of the inverter.

According to these two embodiments, and notably with the embodiment schematically represented in FIG. 10, the frequency f of the power supply voltage E varies in a frequency range comprising limits $f_{val1}$, $f_{val2}$. It is essential for these two frequency limits $f_{val1}$, $f_{val2}$ to respectively have values higher than the resonance frequency $f_0$. It is in fact essential to vary the frequency f of the power supply voltage E of the primary coil L1 in a frequency range whose limits have values higher than the resonance frequency $f_0$ of the charging device.

In effect, by using frequencies higher than the resonance frequency $f_0$, it is possible to create a phase-shift between the electrical currents I1, I2 flowing in the primary L1 and secondary L2 coils. As is represented in FIGS. 3D, 4D, 5D, 6D and 7D, the closer the frequency f of the power supply voltage approaches the high maximum value $f_{val2}$, the more the phase-shift between the primary and secondary currents I1, I2 approaches 180°.

The efficiency losses of an induction charging system are primarily due to the magnetic fields induced. Said locally high fields are created by the electrical currents I1, I2 flowing in the primary and secondary coils L1, L2. These stray magnetic fields notably generate losses by eddy currents, by hysteresis and by proximity effect.

Although difficult to quantify, these efficiency losses are directly proportional to the value of the phase-shift between the electrical currents I1, I2 flowing in the primary and secondary coils L1, L2. If the currents are in phase (phase shift equal to 90°), the induced magnetic fields generated by these currents are also in phase. Since the induced magnetic fields are in phase, this has the effect of increasing the overall magnetic field level, and therefore the overall losses. On the other hand, if the currents are in phase opposition (phase shift equal to 180°) as represented in FIGS. 3D, 4D, 5D, 6D and 7D, the induced magnetic fields oppose one another, which has the effect of reducing the overall magnetic field level and therefore the overall losses. According to a preferential embodiment of the method, the phase-shift between the electrical currents I1, I2 tend towards its maximum when the frequency of the power supply voltage E tends also to its maximum.

Furthermore, the reduction of the losses induced by the phase-shift between the electrical currents I1, I2 is greater than the increase in the losses in the converter linked to the increase in the chopping frequency. Thus, according to a preferential embodiment of the charging device, to improve the overall efficiency of said device, it will be preferable to optimize the phase-shift between the electrical currents I1, I2 rather than minimize the frequency of the inverter.

According to a variant embodiment of the method, the frequency f of the power supply voltage E series between the second high value $f_{val2}$ and the first low value $f_{val1}$. According to another variant embodiment, the frequency f of the power supply voltage E varies between the first low value $f_{val1}$ and the second high value $f_{val2}$.

Furthermore, as described previously, it emerges from the curves 5A to 5D that the threshold electrical power value $P_{obj}$ (6 kW) cannot be reached at the resonance frequency $f_0$ when the coupling coefficient $K_{mag}$ is equal to 0.3. According to the method of the invention, it becomes possible to reach the threshold electrical power value $P_{obj}$ (6 kW) by increasing the frequency f of the power supply voltage E. Only by reaching the maximum value of the frequency (thin dotted line curve) can the power of 6 kW be transmitted to the battery of the motorized vehicle.

Figure 7A:
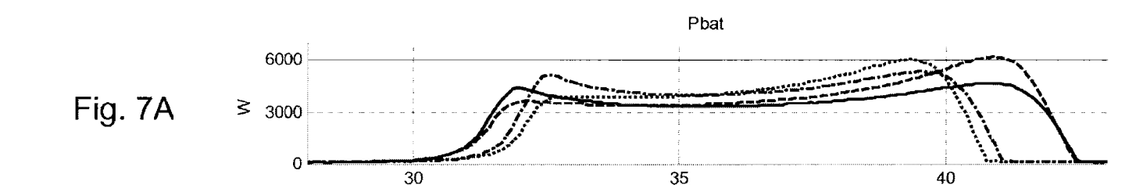
FIGS. 7A to 7D respectively represent trend curves of the transmitted power, of the electrical current in the primary circuit, of the phase-shift between the voltage and the current in the inverter, of the phase-shift between the primary and secondary currents, as a function of the frequency in a variant embodiment of the third mode of operation of the method according to the invention.

According to a refined mode of development of the invention, when the first and second power transmission parameters E, f have been modified according to the steps of the method described above and the threshold electrical power value $P_{obj}$ (6 kW) has not been able to be reached, an additional step of the method consists in changing the frequency tuning of the secondary coil L1 of the charge transmitter and/or of the secondary coil L2 of the charge receiver. Preferably, the method according to the invention consists in modifying a capacitance value C1 connected in series or in parallel with the primary coil L1 and/or a capacitance value C2 connected in series or in parallel with the secondary coil L2. As represented in FIGS. 7A to 7D, by way of exemplary embodiment, the capacitance value C2 connected in series with the secondary coil L2 is increased by 5%. This increase in the value of the capacitance C2 creates an imbalance in the curve representing the power $P_{bat}$ transmitted. Thus, by way of example, assuming that the magnetic coupling coefficient is greater than 0.225 (Kmag>0.225) and the threshold electrical power value $P_{obj}$ is set at 6 kW, FIG. 6A shows that it is not possible to reach the threshold electrical power value $P_{obj}$ when the secondary coil L2 is tuned. By detuning said coil by varying the value of the capacitance C2, it then becomes possible to reach the objective, notably to deliver an electrical power at least equal to 6 kW, as shown in FIG. 7A.

Also, the variation of the value of the capacitances can be an additional means of optimizing the phase-shift between the primary and secondary currents I1 and I2.

Figure 7B:
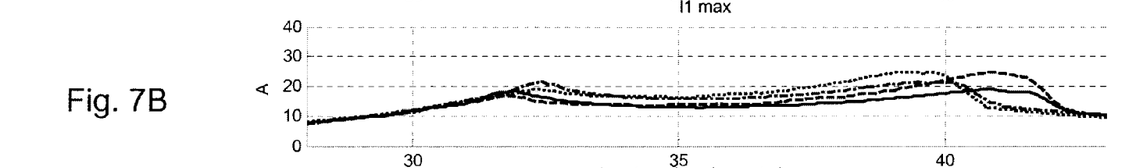
Figure 7C:
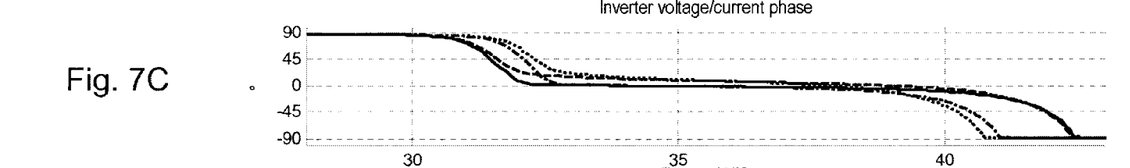
Figure 7D:
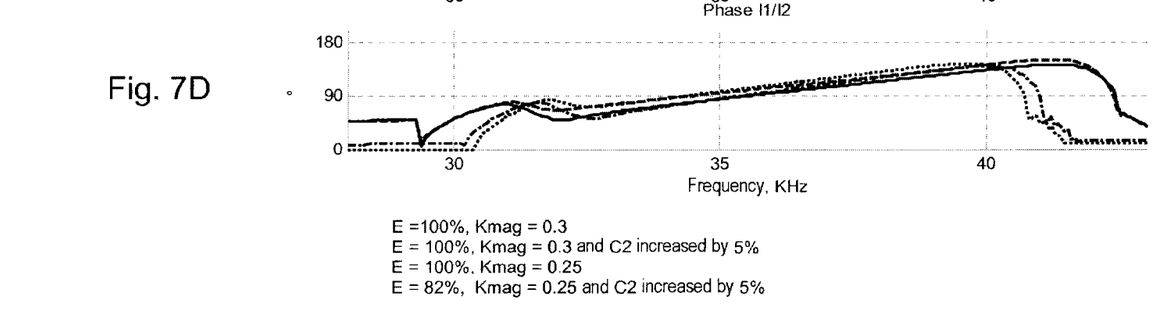

The curves of FIGS. 7B and 7C show that the proposed solution of adjusting resonance capacitances of the primary and/or secondary coils does not imply an increase in the current supplied by the primary inverter. Thus, the methods described in this invention also make it possible to reduce the maximum current that must be supplied to the primary circuit to obtain the desired charging powers. This reduction in current constraint reduces the cost of the inverter.

Figure 8A:
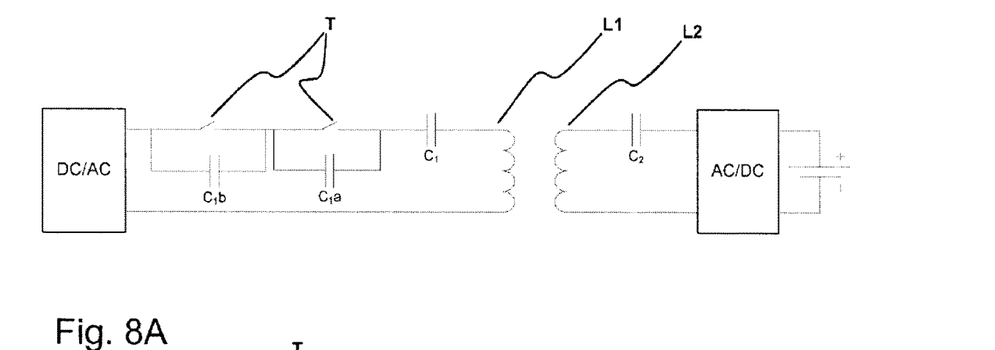
FIGS. 8A and 8B represent schematic views of the means for adjusting the resonance frequencies of the primary circuit of the charging architecture according to an embodiment of the invention.
Figure 9A:
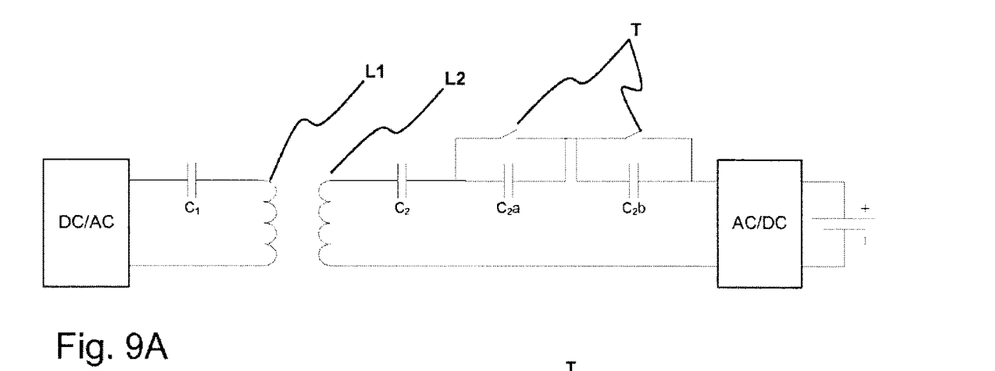
FIGS. 9A and 9B represent schematic views of means for adjusting the resonance frequencies of the secondary circuit of the charging architecture according to an embodiment of the invention.

According to an embodiment of the charging device as represented in FIGS. 8A and 9A, switch means T are suitable for connecting one or more capacitors C1, C2 in series with the primary coil L1 and/or the secondary coil L2. The method according to a mode of development of the invention then consists in controlling the switch means T suitable for connecting one or more capacitors C1, C2 in series with the primary coil L1 and/or the secondary coil L2.

Figure 8B:
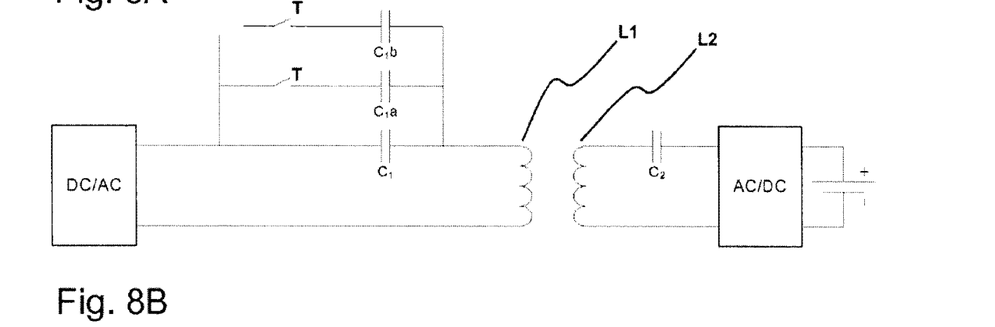
Figure 9B:
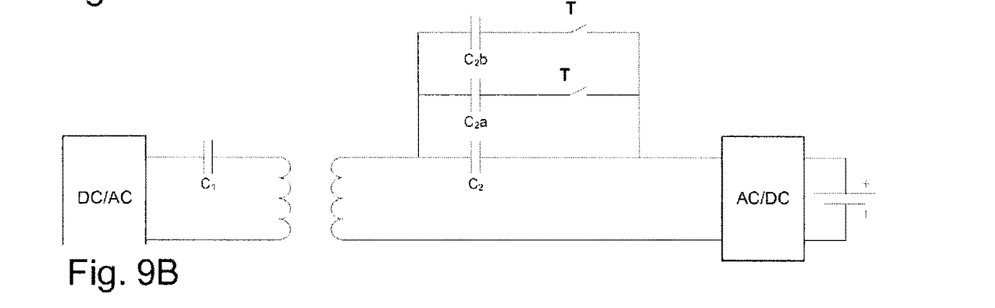

According to another embodiment of the charging device as represented in FIGS. 8B and 9B, switch means T are suitable for connecting one or more capacitors in parallel with the primary coil L1 and/or the secondary coil L2. According to another mode of development of the invention, the method then consists in controlling switch means T suitable for connecting one or more capacitors C1, C2 in parallel with the primary coil L1 and/or the secondary coil L2.

The invention claimed is:

1. A method for charging an electric battery of a motor-driven vehicle by induction, from a charging device including:
   a charge transmitter including a primary coil positioned in a parking space for a motorized vehicle, an inverter configured to deliver to the primary coil an alternating power supply voltage; and
   a charge receiver including a secondary coil arranged in the vehicle positioned in the parking space;
   the method comprising:
   matching a frequency of the power supply voltage of the inverter to a value substantially equal to a resonance frequency of the charging device when a motorized vehicle is located in the parking space, including:
   setting a first power transmission parameter;
   starting an iterative test including:
   setting a value of a second power transmission parameter;
   varying the second power transmission parameter over a second authorized adjustment range;
   measuring power transmitted between the charge transmitter and the charge receiver;
   determining whether the power is equal to or greater than a pre-established operating threshold; and
   determining whether the power increases;
   ending the iterative test if the power transmitted is greater than the pre-established operating threshold;
   setting the power supply voltage of the primary coil to reach the measured transmitted power, the first and second power transmission parameters being set to their previously established value.

2. The charging method as claimed in claim 1, further comprising ending the iterative test if:

the power transmitted is below the free-established operating threshold, and a derivative value of the power transmitted relative to time is negative.

3. The charging method as claimed in claim 1, wherein the first power transmission parameter is variable in a first authorized adjustment range.

4. The charging method as claimed in claim 1, wherein:
the first power transmission parameter is equal to the frequency of the power supply voltage of the inverter;
the second power transmission parameter is equal to the power supply voltage of the primary coil, the power supply voltage varying in second voltage range comprising limits.

5. The charging method as claimed in claim 1, wherein:
the first power transmission parameter is equal to the power supply voltage of the primary coil;
the second power transmission parameter is equal to the frequency of the power supply voltage of the inverter.

6. The charging method as claimed in claim 4, wherein the frequency of the power supply voltage varies in a frequency range comprising limits respectively having values greater than the resonance frequency.

7. The charging method as claimed in claim 6, wherein the frequency of the power supply voltage varies between a second high value and a first low value.

8. The charging method as claimed in claim 6, wherein the frequency of the power supply voltage varies between a first low value and a second high value.

9. The charging method as claimed in claim 1, further comprising changing a frequency tuning of at least one of the primary coil of the charge transmitter and the secondary coil of the charge receiver.

10. The charging method as claimed in claim 9, further comprising modifying at least one of a capacitance value connected in series or in parallel with the primary coil and a capacitance value connected in series or in parallel with the secondary coil.

11. The charging method as claimed in claim 10, further comprising controlling switch means configured to connect one or more capacitors in series with at least one of the primary coil and the secondary coil.

12. The charging method as claimed in claim 10, further comprising controlling switch means configured to connect one or more capacitors in parallel with at least one of the primary coil and the secondary coil.

13. The charging method as claimed in claim 1, wherein a magnetic coupling between the primary coil and the secondary coil is controllable, a coupling coefficient between the two coils varying between 15% and 45% of the maximum value of the coefficient.

* * * * *